United States Patent
Morita et al.

(10) Patent No.: US 9,618,694 B2
(45) Date of Patent: Apr. 11, 2017

(54) OPTICAL WAVEGUIDE AND ARRAYED WAVEGUIDE GRATING

(75) Inventors: Keiichi Morita, Yokohama (JP); Kazumi Shimizu, Yokohama (JP); Kouji Kawashima, Yokohama (JP); Tomoharu Niitsu, Yokohama (JP)

(73) Assignee: NTT ELECTRONICS CORPORATION, Kanagawa (JP)

( * ) Notice: Subject to any disclaimer, the term of this patent is extended or adjusted under 35 U.S.C. 154(b) by 943 days.

(21) Appl. No.: 13/698,573

(22) PCT Filed: May 10, 2011

(86) PCT No.: PCT/JP2011/060699
§ 371 (c)(1),
(2), (4) Date: Nov. 16, 2012

(87) PCT Pub. No.: WO2011/148777
PCT Pub. Date: Dec. 1, 2011

(65) Prior Publication Data
US 2013/0058608 A1    Mar. 7, 2013

(30) Foreign Application Priority Data
May 27, 2010   (JP) .................................. 2010-121904
Nov. 9, 2010   (JP) .................................. 2010-251223

(51) Int. Cl.
*G02B 6/34* (2006.01)
*G02B 6/12* (2006.01)
*G02B 6/28* (2006.01)

(52) U.S. Cl.
CPC ........ *G02B 6/12014* (2013.01); *G02B 6/2813* (2013.01)

(58) Field of Classification Search
CPC .................... G02B 6/12028; G02B 6/29301
See application file for complete search history.

(56) References Cited

U.S. PATENT DOCUMENTS 5,745,618 A    4/1998   Li .................................... 385/46
6,381,052 B1   4/2002   Delisle et al.
(Continued)

FOREIGN PATENT DOCUMENTS

JP    2001-159718    6/2001
JP    2003-014962    1/2003
(Continued)

OTHER PUBLICATIONS

International Search Report dated Jun. 28, 2011 for corresponding International Patent Application No. PCT/JP2011/060699 with English translation.
(Continued)

*Primary Examiner* — Sung Pak
*Assistant Examiner* — Hoang Tran
(74) *Attorney, Agent, or Firm* — Ohlandt, Greeley, Ruggiero & Perle, L.L.P.

(57) ABSTRACT

A technique that does not increase the circuit size, does not make the circuit design and manufacturing difficult, and can reduce insertion loss when light enters from a slab waveguide toward an arrayed waveguide or when the light enters from the arrayed waveguide toward the slab waveguide. An optical waveguide provided with a slab waveguide in which a grating is formed therein at a distance from an end, and an arrayed waveguide whose end is connected to an end of the slab waveguide at a position where a constructive interference portion of a self-image of the grating is formed. An arrayed waveguide grating provided with a first input/output waveguide, the above-mentioned optical waveguide where an end of the slab waveguide on the opposite side of the arrayed waveguide is connected to an end of the first input/output waveguide, a second slab waveguide connected to an end of the arrayed waveguide on the opposite side of the slab waveguide, and a second input/output waveguide (Continued)

connected to an end of the second slab waveguide on the opposite side of the arrayed waveguide.

6 Claims, 17 Drawing Sheets

(56) References Cited

U.S. PATENT DOCUMENTS

| | | | |
|---|---|---|---|
| 6,396,977 B1 | 5/2002 | Dragone | |
| 6,549,696 B1* | 4/2003 | Uetsuka | G02B 6/12014 385/24 |
| 6,892,004 B1 | 5/2005 | Yu | 385/39 |
| 7,006,729 B2 | 2/2006 | Wang et al. | 385/37 |
| 2002/0159696 A1 | 10/2002 | Yamauchi et al. | |
| 2005/0089274 A1 | 4/2005 | Petermann et al. | |

FOREIGN PATENT DOCUMENTS

| | | |
|---|---|---|
| JP | 2006-030687 | 2/2006 |
| JP | 2008-293020 | 12/2008 |

OTHER PUBLICATIONS

International Preliminary Report on Patentability dated Dec. 6, 2012 for corresponding International Patent Application No. PCT/JP2011/060699 with English translation consisting of 12 pages.

Helfert, et al., "Studies of the Self-Imaging Effect in Multimode Waveguides", Transparent Optical Networks, 2008. ICTON 2008. 10th Anniversary International Conference on, IEEE, Piscataway, NJ, USA, Jun. 22, 2008, pp. 255-258.

Extended European Search Report dated Mar. 4, 2013 for corresponding European Patent Application No. 11786477.7-1504 consisting of 7 pages.

\* cited by examiner

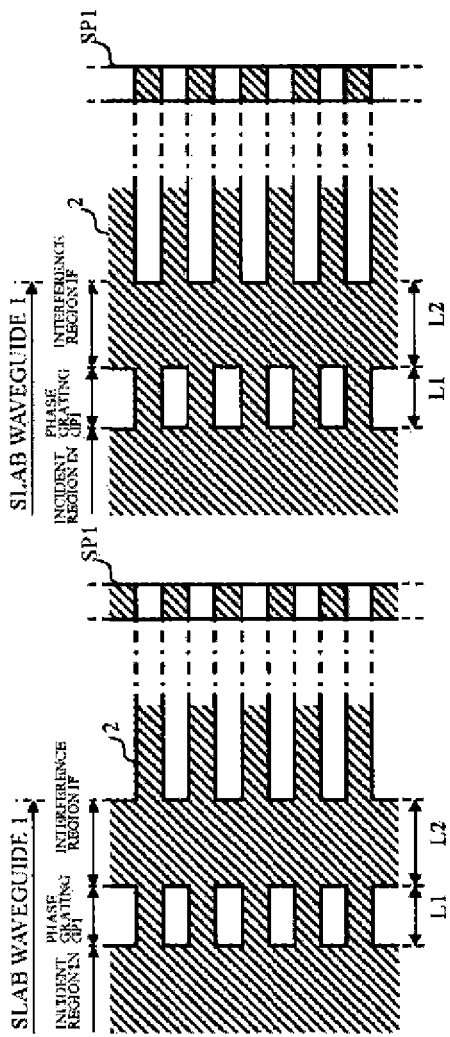
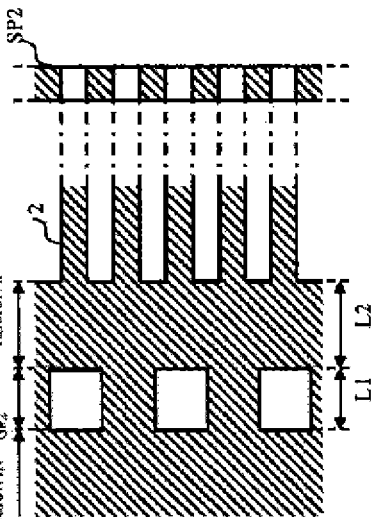
FIG. 6A
FIG. 6B
FIG. 6C

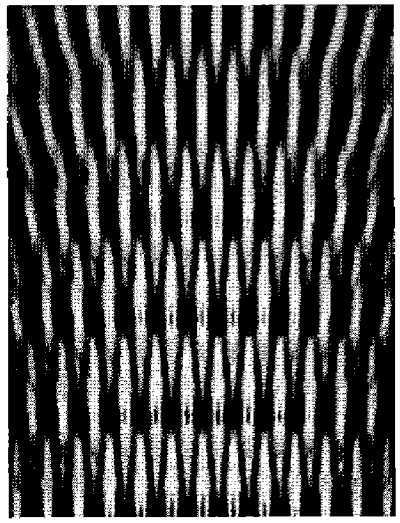
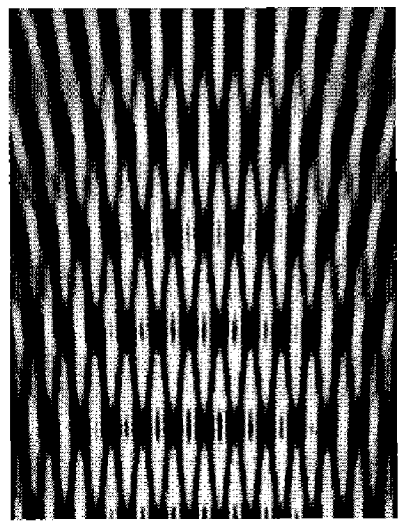
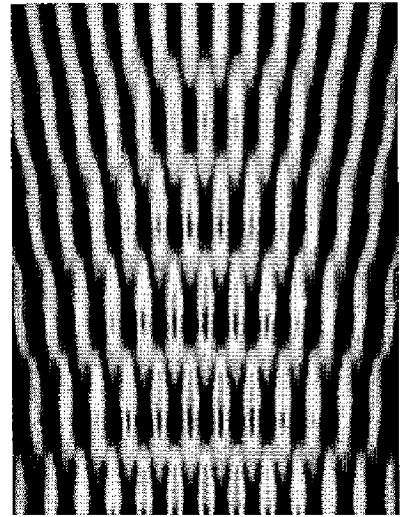
FIG. 7

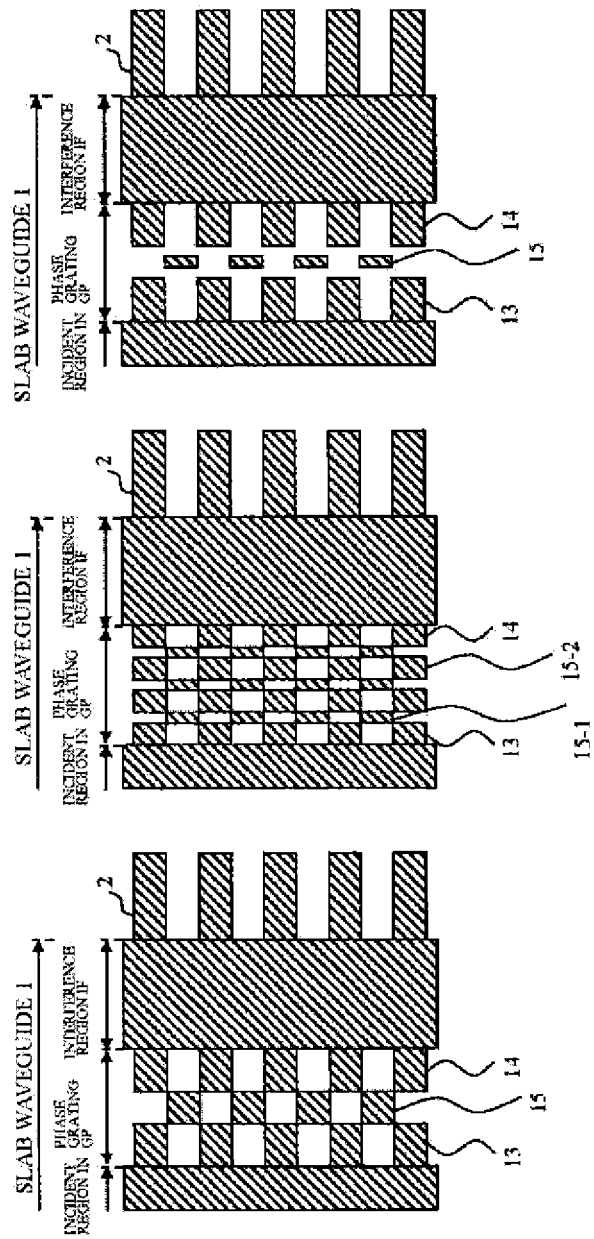

OPTICAL WAVEGUIDE AND ARRAYED WAVEGUIDE GRATING

BACKGROUND

1. Field of the Disclosure

The present disclosure relates to an optical waveguide and an arrayed waveguide grating, which can reduce insertion loss when light enters from a slab waveguide toward an arrayed waveguide or when the light enters from the arrayed waveguide toward the slab waveguide.

2. Discussion of the Background Art

In a DWDM (Dense Wavelength Division Multiplexing) multiplexer/demultiplexer, an M×N star coupler, a 1×N splitter, and so on, Patent Documents 1 to 6 disclose such a connection structure between a slab waveguide and an arrayed waveguide that when light enters from a slab waveguide toward an arrayed waveguide, the light does not radiate in a clad layer as a radiation mode between the arrayed waveguides adjacent to each other.

In the Patent Documents 1 to 4, a transition region where the refractive index of the waveguide gradually changes from the slab waveguide toward the arrayed waveguide is disposed. In the Patent Document 5, a slope portion is disposed between the slab waveguide and the arrayed waveguide. In the Patent Document 6, a core layer and a plurality of island-shaped regions are arranged in the slab waveguide. The refractive index of the island-shaped region is smaller than the refractive index of the core layer. The island-shaped regions face a clad layer provided between the adjacent arrayed waveguides. The width of the island-shaped region in a direction substantially vertical to a light propagation direction becomes narrower from the slab waveguide toward the arrayed waveguide. Light passing through the core layer provided between the island-shaped regions adjacent to each other propagates toward the arrayed waveguide without changing the propagation direction. Light passing through the island-shaped region changes the propagation direction due to a tapered shape of the island-shaped region and propagates toward the arrayed waveguide. The tapered shape and the position of the island-shaped region are optimized, whereby the light is concentrated on the arrayed waveguide and propagates in the arrayed waveguide as a propagation mode.

PATENT DOCUMENTS

[Patent Document 1] U.S. Pat. No. 5,745,618
[Patent Document 2] U.S. Pat. No. 7,006,729
[Patent Document 3] U.S. Pat. No. 6,892,004
[Patent Document 4] JP 2008-293020 A
[Patent Document 5] JP 2001-159718 A
[Patent Document 6] JP 2003-14962 A In the Patent Documents 1 to 4, a large circuit size is required since the transition region is disposed. In the Patent Document 5, circuit manufacturing is difficult since the slope portion is disposed. In the Patent Document 6, circuit designing is difficult since the tapered shape and the position of the island-shaped region are required to be optimized.

Thus, in order to solve the above problems, the present disclosure has the purpose of providing an optical waveguide and an arrayed waveguide grating, which do not increase the circuit size, do not make the circuit design and manufacturing difficult, and can reduce insertion loss when light enters from a slab waveguide toward an arrayed waveguide or when the light enters from the arrayed waveguide toward the slab waveguide.

SUMMARY

In order to achieve the above object, a grating is formed in the slab waveguide, and an end of the arrayed waveguide is disposed at a position where a constructive interference portion of a self-image of the grating is formed.

Specifically, the present disclosure provides an optical waveguide which is provided with a slab waveguide in which a grating is formed therein at a distance from an end and an arrayed waveguide whose end is connected to an end of the slab waveguide at a position where a constructive interference portion of a self-image of the grating is formed.

According to the above constitution, due to Talbot effect, the self-image of the grating is formed according to wavelength of light and a period of the grating formed in the slab waveguide. The end of the arrayed waveguide is disposed at the position where the constructive interference portion of the self-image of the grating is formed, so that when light enters from the slab waveguide toward the arrayed waveguide, the light is concentrated on the arrayed waveguide and propagates in the arrayed waveguide as a propagation mode. The size of an optical waveguide is not increased, the design and manufacturing is not made difficult, and insertion loss can be reduced when the light enters from the slab waveguide toward the arrayed waveguide or when the light enters from the arrayed waveguide toward the slab waveguide.

Further, the present disclosure provides an optical waveguide in which the grating is a phase grating.

According to the above constitution, the incident light is diffracted due to a phase difference given to incident light, and therefore, loss of the incident light can be reduced.

Furthermore, the present disclosure provides an optical waveguide in which the phase difference given to the incident light by the phase grating is approximately 90 degrees.

According to the above constitution, the self-image of the phase grating is clearly formed.

Furthermore, the present disclosure provides an optical waveguide in which the phase difference given to the incident light by the phase grating is approximately 180 degrees.

According to the above constitution, the self-image of the phase grating is clearly formed.

Furthermore, the present disclosure provides an optical waveguide in which the phase grating is provided with refractive index difference regions which are disposed in the slab waveguide at a distance in a direction substantially vertical to a light propagation direction and have a refractive index different from the refractive indices of other regions in the slab waveguide.

According to the above constitution, the phase grating can be easily formed in the slab waveguide.

Furthermore, the present disclosure provides an optical waveguide in which the refractive index difference regions adjacent to each other are connected by a region having a refractive index equal to the refractive index of the refractive index difference region, and the refractive index difference regions are integral with each other across the entire phase grating.

According to the above constitution, the phase grating can be easily formed in the slab waveguide.

Furthermore, the present disclosure provides an optical waveguide which is provided with one or more first input/ output waveguide(s), an optical waveguide where an end of the slab waveguide on an opposite side of the arrayed waveguide is connected to an end of the first input/output waveguide, a second slab waveguide connected to an end of the arrayed waveguide on an opposite side of the slab waveguide, and one or more second input/output waveguide(s) connected to an end of the second slab waveguide on the opposite side of the arrayed waveguide.

According to the above constitution, the size of the arrayed waveguide grating is not increased, the design and manufacturing is not made difficult, and the insertion loss can be reduced when light enters from the slab waveguide toward the arrayed waveguide or when the light enters from the arrayed waveguide toward the slab waveguide.

Furthermore, the present disclosure provides an arrayed waveguide grating which is provided with two or more first input/output waveguides, a first slab waveguide connected to an end of the first input/output waveguides, an arrayed waveguide connected to an end of the first slab waveguide on an opposite side of the first input/output waveguides, a second slab waveguide connected to an end of the arrayed waveguide on an opposite side of the first slab waveguide, and one or more second input/output waveguide(s) connected to an end of the second slab waveguide on an opposite side of the arrayed waveguide, wherein in the first slab waveguide, a grating is formed therein at a distance from an end, and an end of the arrayed waveguide is connected to a position deviated from a position where a constructive interference portion of a self-image of the grating is formed so that a light intensity distribution from the first input/output waveguides is substantially uniform when light enters from the second input/output waveguide toward the first input/output waveguides.

According to the above constitution, loss in two or more of the first input/output waveguides can be uniformed in a demultiplexer through which light enters from the second input/output waveguide toward the first input/output waveguide or a multiplexer through which light enters from the first input/output waveguide toward the second input/output waveguide.

Furthermore, the present disclosure provides an arrayed waveguide grating in which the grating is a phase grating.

According to the above constitution, the incident light is diffracted due to a phase difference given to the incident light, and therefore, loss of the incident light can be reduced.

Furthermore, the present disclosure provides an arrayed waveguide grating in which the phase difference given to the incident light by the phase grating is approximately 90 degrees.

According to the above constitution, the self-image of the phase grating is clearly formed.

Furthermore, the present disclosure provides an arrayed waveguide grating in which the phase difference given to the incident light by the phase grating is approximately 180 degrees.

According to the above constitution, the self-image of the phase grating is clearly formed.

Furthermore, the present disclosure provides an arrayed waveguide grating in which the phase grating is provided with refractive index difference regions which are disposed in the slab waveguide at a distance in a direction substantially vertical to a light propagation direction and have a refractive index different from the refractive indices of other regions in the slab waveguide.

According to the above constitution, the phase grating can be easily formed in the slab waveguide.

Furthermore, the present disclosure provides an arrayed waveguide grating in which the refractive index difference regions adjacent to each other are connected by a region having a refractive index equal to the refractive index of the refractive index difference regions, and the refractive index difference regions are integral with each other across the entire phase grating.

According to the above constitution, the phase grating can be easily formed in the slab waveguide.

Effects of the Disclosure

The present disclosure can provide an optical waveguide and an arrayed waveguide grating, which do not increase the circuit size, do not make the circuit design and manufacturing difficult, and can reduce insertion loss when light enters from a slab waveguide toward an arrayed waveguide or when the light enters from the arrayed waveguide toward the slab waveguide.

BRIEF DESCRIPTION OF THE DRAWINGS

FIGS. 6A, 6B and 6C are views showing a positional relationship between a phase grating of a slab waveguide and an incident end of an arrayed waveguide.

FIG. 7 is a view showing the calculation results of the Talbot effect.

FIGS. 14A, 14B and 14C are views showing a structure of the optical waveguide.

DETAILED DESCRIPTION OF THE PREFERRED EMBODIMENT

Figure 1:
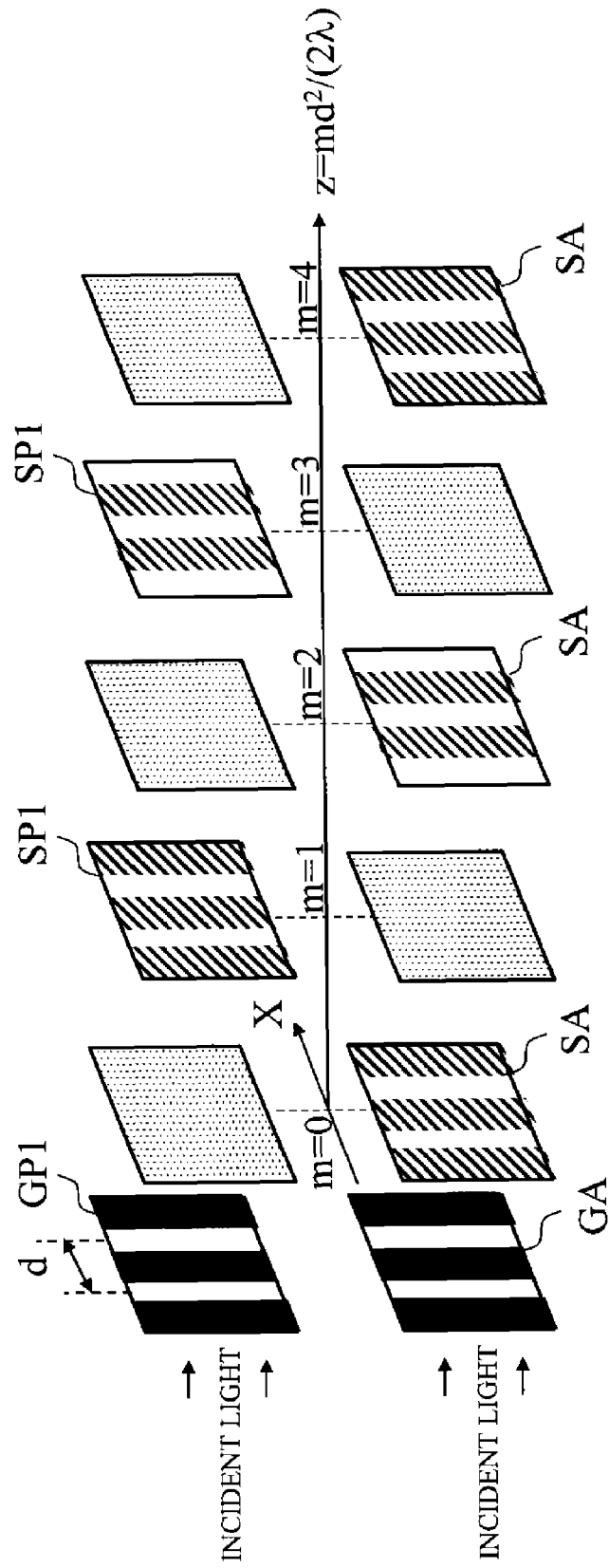
FIG. 1 is a view showing a phenomenon of Talbot effect.

Embodiments of the present disclosure will be described with reference to the accompanying drawings. The embodiments to be described hereinafter are examples of the present disclosure, and the present disclosure is not limited to the following embodiments. Components denoted by the same reference numerals in the description and the drawings mutually represent the same components.

Embodiment 1

In an Embodiment 1, first, a phenomenon and calculation results of Talbot effect will be described. Next, an optical waveguide which can reduce insertion loss when light enters from a slab waveguide toward an arrayed waveguide or when the light enters from the arrayed waveguide toward the slab waveguide will be described based on the phenomenon and the calculation results of the Talbot effect.

The Talbot effect means that diffracted lights interfere with each other when light enters a grating, whereby a light intensity distribution similar to a pattern of the grating is realized as a self-image of the grating at a position apart from the grating with a distance specified according to the wavelength of the light and a period of the grating, and the Talbot effect is applied to a Talbot interferometer.

Figure 2:
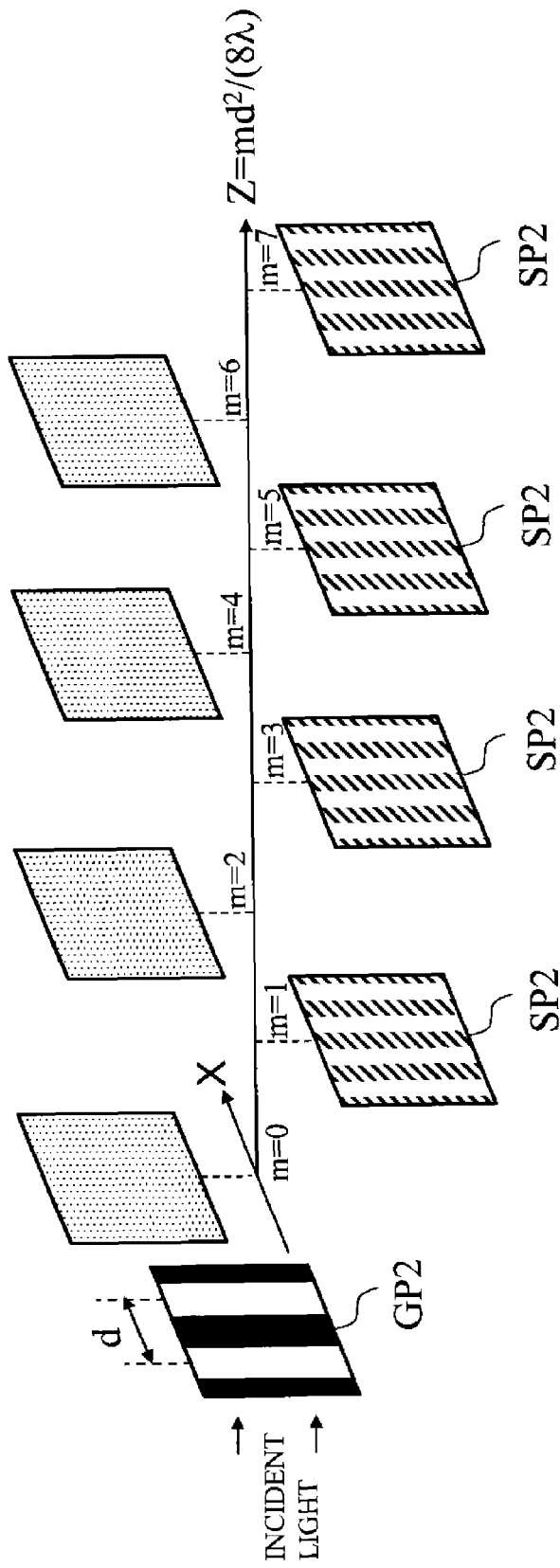
FIG. 2 is a view showing the phenomenon of the Talbot effect.

FIGS. 1 and 2 are views showing the phenomenon of the Talbot effect. Gratings GP1 and GP2 are phase gratings giving a phase difference to incident light, and a grating GA is an amplitude grating giving an intensity difference to the incident light. The phenomenon of the Talbot effect associated with the phase grating GP1 is shown in an upper half of FIG. 1, the phenomenon of the Talbot effect associated with the amplitude grating GA is shown in a lower half of FIG. 1, and the phenomenon of the Talbot effect associated with the phase grating GP2 is shown in FIG. 2. Each period of the phase gratings GP1 and GP2 and the amplitude grating GA is d. The phase difference given to the incident light by the phase grating GP1 is 90°. The phase difference given to the incident light by the phase grating GP2 is 180°. The phase gratings GP1 and GP2 and the amplitude grating GA are arranged at a position of z=0 in an x-y plane (y axis is not shown in FIGS. 1 and 2) (in FIGS. 1 and 2, as a matter of convenience, the phase gratings GP1 and GP2 and the amplitude grating GA are shown on the left side of the drawings relative to the position of z=0). The wavelength of the incident light is $\lambda$. The incident light enters as parallel light in the z-axis direction as shown by arrows at the left ends of FIGS. 1 and 2.

First, the phenomenon of the Talbot effect associated with the phase grating GP1 will be described. When $z=md^2/(2\lambda)$, a light intensity distribution formed immediately after the phase grating GP1 is uniform at the position of m=0 as shown by a sand portion, and light intensity distributions similar to this light intensity distribution are shown at positions of m=2, 4, 6, 8, ..., 4n+2, 4n+4, ... (n is an integer of not less than 0). Meanwhile, at positions of m=1, 3, 5, 7, ..., 4n+1, 4n+3, ..., self-images SP1 of the phase grating GP1 are clearly formed as shown by diagonal lines and white portions. Although the self-images SP1 of the phase grating GP1 are formed at positions other than the positions of m=1, 3, 5, 7, ..., 4n+1, 4n+3, ..., the self-images SP1 are not clearly formed, and a boundary between a constructive interference portion and a destructive interference portion is not clear. The intensity period of the self-image SP1 of the phase grating GP1 is d.

The self-images SP1 of the phase grating GP1 formed at the positions of m=1, 5, ..., 4n+1, ... are shifted by d12 in the x-axis direction in comparison with the self-images SP1 of the phase grating GP1 formed at the positions of m=3, 7, ..., 4n+3, ....

Next, the phenomenon of the Talbot effect associated with the amplitude grating GA will be described. When $z=md^2/(2\lambda)$, the light intensity distribution formed immediately after the amplitude grating GA is shown at the position of m=0, and light intensity distributions similar to this light intensity distribution are shown as self-images SA of the amplitude grating GA at the positions of m=2 and 4. Although the self-images SA of the amplitude grating GA are clearly formed at the position of m=2, 4, 6, 8, ..., 4n+2, 4n+4, ... (n is an integer of not less than 0) as shown by diagonal lines and white portions, the self-images SA of the amplitude grating GA are not formed at the positions of m=1, 3, 5, 7, ..., 4n+1, 4n+3, ... as shown by sand portions, and a uniform intensity distribution exists. Although the self-images SA of the amplitude grating GA are formed at positions other than the positions of m–2, 4, 6, 8, ..., 4n+2, 4n+4, ..., the self-images SA are not clearly formed, and the boundary between the constructive interference portion and the destructive interference portion is not clear. The intensity period of the self-image SA of the amplitude grating GA is d.

The self-images SA of the amplitude grating GA formed at the positions of m=2, 6, ..., 4n+2, ... are shifted by d/2 in the x-axis direction in comparison with the self-images SA of the amplitude grating GA formed at the positions of m=4, 8, ..., 4n+4, ....

Next, the phenomenon of the Talbot effect associated with the phase grating GP2 will be described. When $z=md^2/(8\lambda)$, the light intensity distribution formed immediately after the phase grating GP2 is uniform at the position of m=0 as shown by a sand portion, and light intensity distributions similar to this light intensity distribution are shown at the positions of m=2, 4, 6, ..., 2n, ... (n is an integer of not less than 0). Meanwhile, at the positions of m=1, 3, 5, 7, ..., 2n+1, ..., self-images SP2 of the phase grating GP2 are clearly formed as shown by diagonal lines and white portions. Although the self-images SP2 of the phase grating GP2 are formed at positions other than the positions of m=1, 3, 5, 7, ..., 2n+1, ..., the self-images SP2 are not clearly formed, and the boundary between the constructive interference portion and the destructive interference portion is not clear. The intensity period of the self-image SP2 of the phase grating GP2 is d/2. The self-image SP2 does not shift for each order.

The phase gratings GP1 and GP2 change the speed of light according to the position of their x coordinate and give a phase difference to incident light. The amplitude grating GA changes absorption of light according to the position of the x coordinate and gives an intensity difference to the incident light. Accordingly, when the optical waveguide according to the present disclosure is applied to an arrayed waveguide grating described in an Embodiment 4, the phase gratings GP1 and GP2 are preferably used in order to reduce loss of light. Thus, in the following description, the case of using the phase gratings GP1 and GP2 will be described in detail, and in the case of using the amplitude grating GA, portions different from the case of using the phase gratings GP1 and GP2 will be briefly described.

Figure 3:
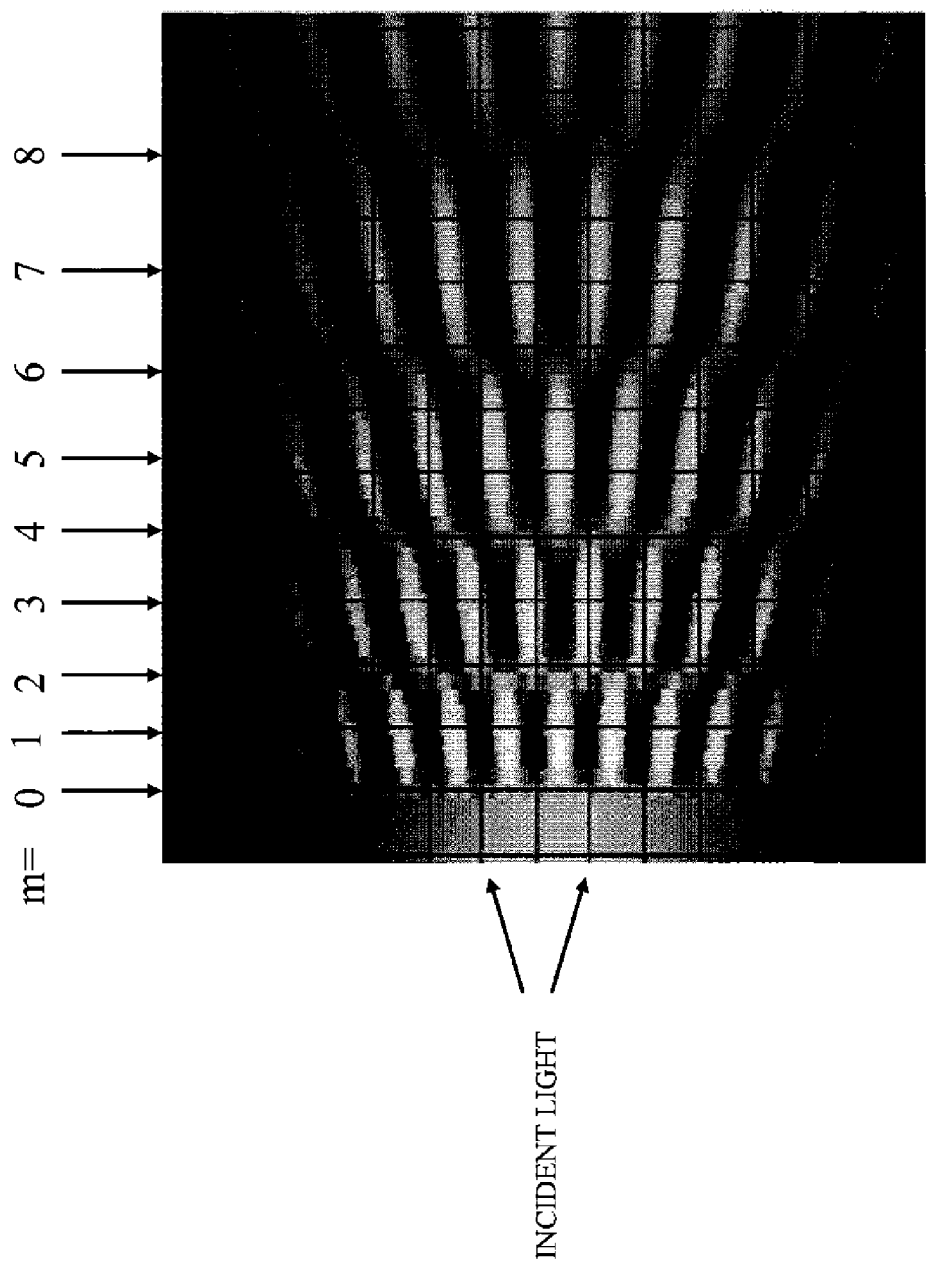
FIG. 3 is a view showing calculation results of the Talbot effect.
Figure 4:
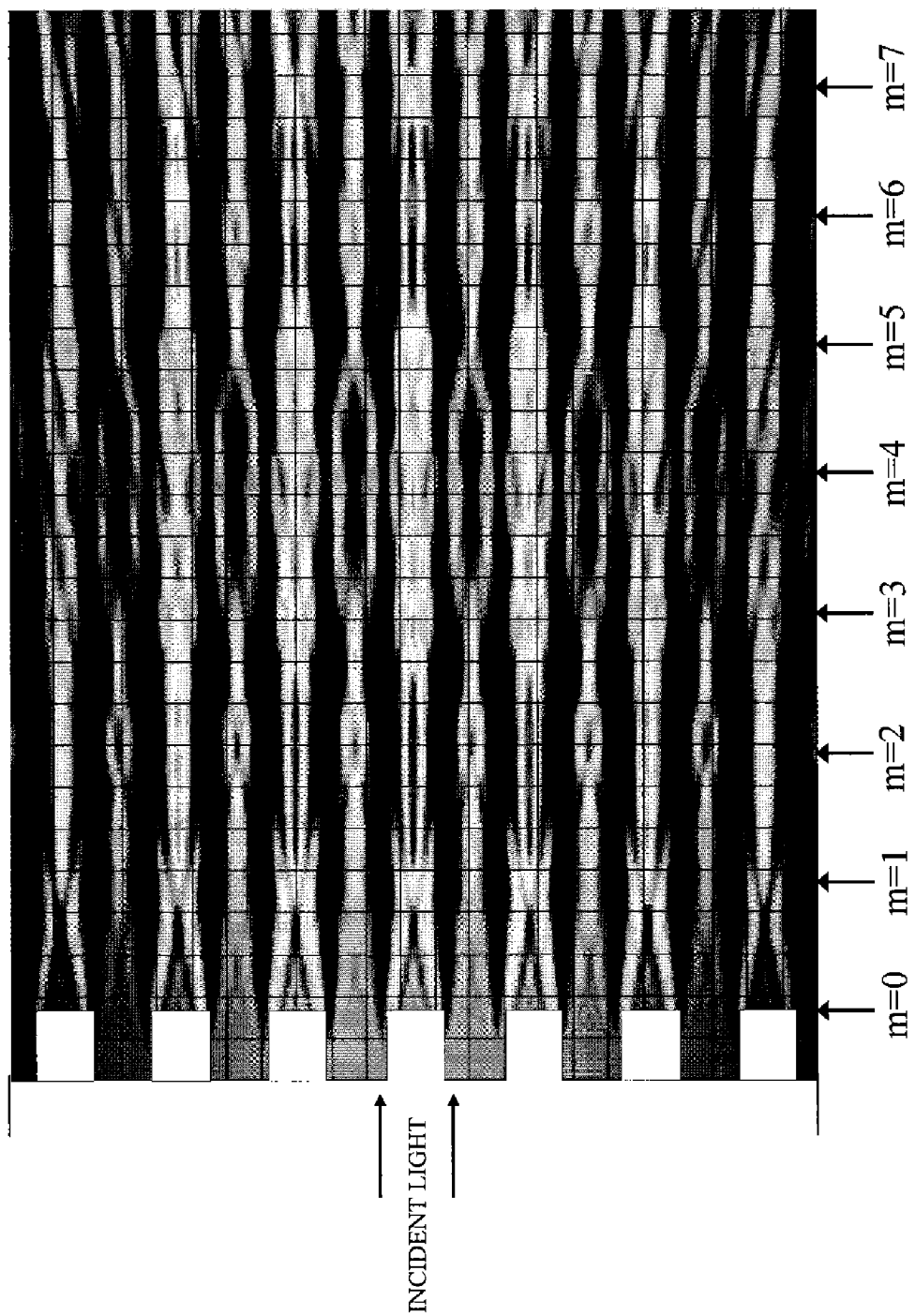
FIG. 4 is a view showing calculation results of the Talbot effect.

FIG. 3 is a view showing calculation results of the Talbot effect of the phase grating GP1. Although in FIG. 1, incident light is parallel light, the incident light in FIG. 3 is diffusion light in consideration that the light propagating in the slab waveguide is not parallel light but diffusion light. The incident light enters as diffusion light in a right direction as shown by arrows at the left end of FIG. 3. FIG. 4 is a view showing calculation results of the Talbot effect of the phase grating GP2. In FIG. 4, incident light is parallel light. The incident light enters as parallel light in a right direction as shown by arrows at the left end of FIG. 4. In FIGS. 3 and 4, the phase gratings GP1 and GP2 are arranged at the position of m=0.

Although the self-images SP1 of the phase grating GP1 are clearly formed at the positions of m=1, 3, 5, 7, . . . , 4n+1, 4n+3, . . . as shown by a clear black and white gradation, the self-images SP1 are not clearly formed at the positions of m=2, 4, 6, 8, . . . , 4n+2, 4n+4, . . . as shown by an unclear black and white gradation. At positions other than the positions of m=1, 3, 5, 7, . . . , 4n+1, 4n+3, . . . , the closer to the positions of m=1, 3, 5, 7, . . . , 4n+1, 4n+3, . . . , the more clearly the self-image SP1 of the phase grating GP1 are formed, and the closer to the positions of m=2, 4, 6, 8, . . . , 4n+2, 4n+4, . . . , the less clearly the self-image SP1 of the phase grating GP1 is formed. The positions of m=0, 1, 2, 3, . . . are not arranged at regular intervals because the incident light is not parallel light but diffusion light.

When FIG. 3 is seen as a whole, the black and white gradation is spread in the vertical direction of FIG. 3 as it progresses in the right side direction. When FIG. 3 is seen in detail, the black and white gradation drastically changes near the positions of m=2, 4, 6, 8, . . . , 4n+2, 4n+4, . . . . This result corresponds to the fact that in FIG. 1, the self-images SP1 of the phase grating GP1 formed at the positions of m=1, 5, . . . , 4n+1, . . . are shifted by d/2 in the x-axis direction in comparison with the self-images SP1 of the phase grating GP1 formed at the positions of m=3, 7, . . . , 4n+3, . . . . The self-images SP1 of the phase grating GP1 formed at the position of m=1, 3, 5, 7, . . . , 4n+1, 4n+3, . . . are more clearly formed as m becomes smaller. Although the calculation results of FIG. 4 and a schematic drawing in FIG. 2 show similar tendencies, in FIG. 4 a peak having a period the same as the period of the phase grating GP2 is confirmed at the positions of m=2, 4, . . . . This is because while the simulation in FIG. 4 is calculation based on a general optical circuit, when the phase grating GP2 is formed of a material having a small refractive index difference such as a core material and a clad material, the phase grating GP2 is elongated in a light propagation direction, light propagating in a portion having a low refractive index couples to a portion having a high refractive index as the propagation distance becomes longer, and the intensity distribution occurs at an end of the phase grating GP2.

Figure 5:
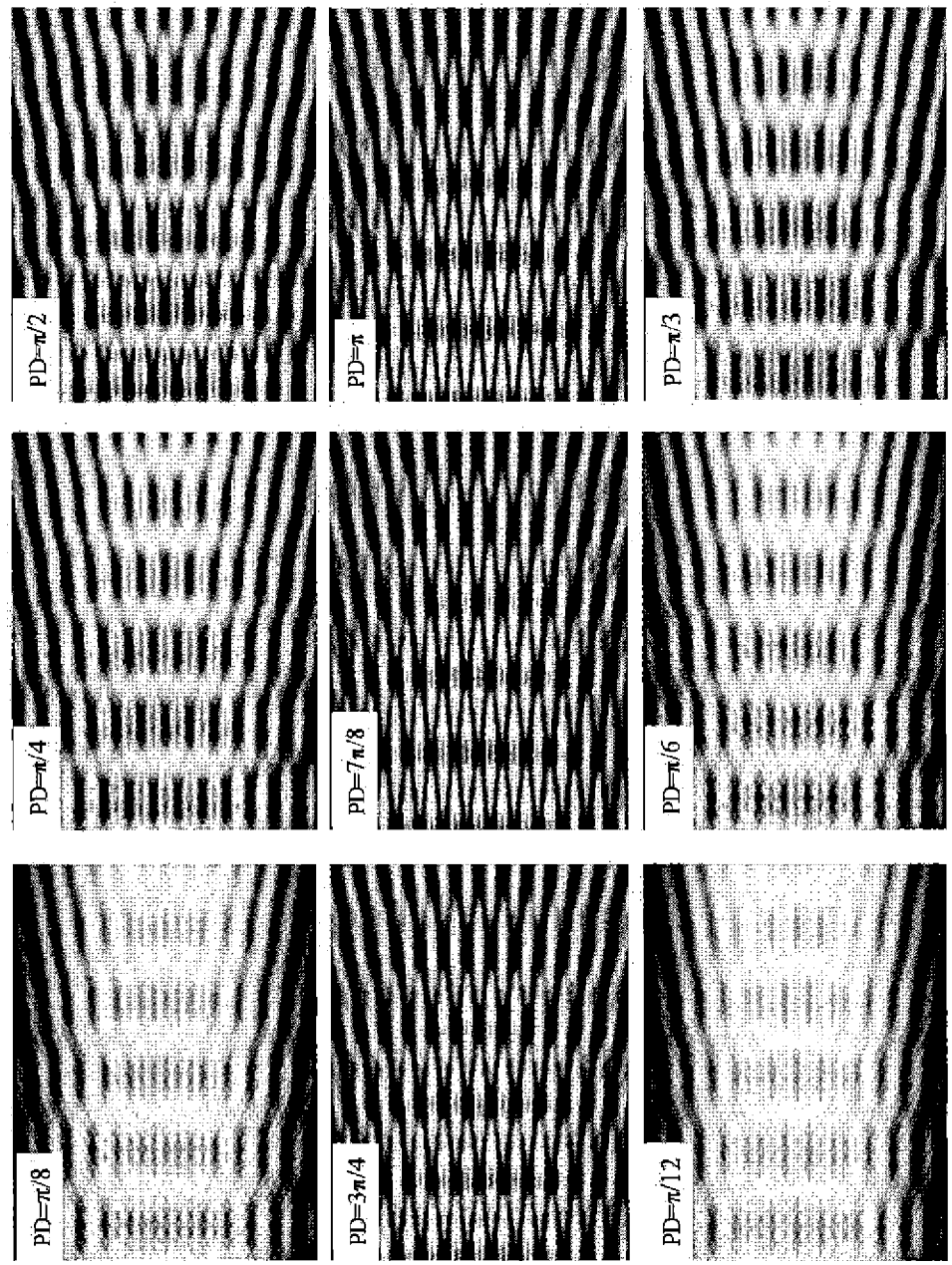
FIG. 5 is a view showing calculation results of the Talbot effect.

FIG. 5 is a view showing calculation results of the Talbot effect on the phase grating GP giving various phase differences to incident light. In FIG. 5, the phase differences given to the incident light by the phase grating GP are π/8, π/4, π/2, 3π/4, 7π/8, π, π/12, π/6, and π/3 at the left end of the upper stage, the center of the upper stage, the right end of the upper stage, the left end of the intermediate stage, the center of the intermediate stage, the right end of the intermediate stage, the left end of the lower stage, the center of the lower stage, and the right end of the lower stage, respectively. In FIG. 5, the incident light is parallel light, and the phase grating GP is disposed at the left end of each drawing. As long as the self-image SP of the phase grating GP can be clearly formed by the Talbot effect, the phase difference given to the incident light by the phase grating GP may be a phase difference other than the above phase differences in FIG. 5.

Next, the optical waveguide, which can reduce the insertion loss when light enters from the slab waveguide toward the arrayed waveguide, or when the light enters from the arrayed waveguide toward the slab waveguide, will be described based on the phenomenon and the calculation results of the Talbot effect. FIGS. 6A, 6B and 6C are views showing a positional relationship between the phase grating GP1 or GP2 of a slab waveguide 1 and an end of an arrayed waveguide 2. The respective left sides of FIGS. 6A to 6C show the overall configuration of the optical waveguide, the respective right sides of FIGS. 6A and 6B show the self-image SP1 of the phase grating GP1, the right side of FIG. 6C shows the self-image SP2 of the phase grating GP2, and in each of FIGS. 6A to 6C, the left and right side views are aligned in the vertical direction of FIGS. 6A, 6B and 6C by alternate long and short dashed lines. In FIGS. 6A and 6B, the positional relationship between the phase grating GP1 of the slab waveguide 1 and the end of the arrayed waveguide 2 is different from each other.

The slab waveguide 1 is constituted of an incident region IN, the phase grating GP1 or GP2, and an interference region IF. The incident region IN is disposed on the incident side of the slab waveguide 1, and incident light propagates in the incident region IN. The phase grating GP1 or GP2 is provided in the slab waveguide 1 and disposed between the incident region IN and the interference region IF, and formed from a region shown by diagonal lines and a region shown by a white portion, which have different refractive indices. The refractive index of the region shown by the diagonal lines may be larger or smaller than the refractive index of the region shown by the white portion. Incident light propagates in the region with a large refractive index at low speed and propagates in the region with a small refractive index at high speed. The phase grating GP1 or GP2 changes the speed of light according to the position in the vertical direction of FIGS. 6A, 6B and 6C and gives a phase difference to the incident light. The interference region IF is disposed at an end of the slab waveguide 1 on the arrayed waveguide 2 side, and diffraction light is propagated in the interference region IF.

The arrayed waveguide 2 is connected to the interference region IF of the slab waveguide 1 at a constructive interference portion shown by the white portion of the self-image SP1 of the phase grating GP1 or the self-image SP2 of the phase grating GP2. Namely, since the diffraction light is intensively distributed in the constructive interference portion shown by the white portion of the self-image SP1 of the phase grating GP1 or the self-image SP2 of the phase grating GP2, the diffraction light propagates in the arrayed waveguide 2 as a propagation mode. Since the diffraction light is hardly distributed in a destructive interference portion shown by the diagonal lines of the self-image SP1 of the phase grating GP1 or the self-image SP2 of the phase grating GP2, the diffraction light does not radiate in the clad layer as a radiation mode. In FIGS. 6A, 6B and 6C, a plurality of the array waveguides 2 are connected; however, only one waveguide may be connected.

In FIG. 6A, at the position corresponding to the region shown by the diagonal lines of the phase grating GP1, the constructive interference portion shown by the white portion of the self-image SP1 of the phase grating GP1 is formed, and the end of the arrayed waveguide 2 is connected. In FIG. 6B, at the position corresponding to the region shown by the white portion of the phase grating GP1, the constructive interference portion shown by the white portion of the self-image SP1 of the phase grating GP1 is formed, and the end of the arrayed waveguide 2 is connected. The different positional relationships thus exist as the positional relationship between the phase grating GP1 of the slab waveguide 1 and the end of the arrayed waveguide 2, and this result corresponds to the fact that, as shown in FIG. 1, the self-images SP1 of the phase grating GP1 formed at the positions of m=1, 5, . . . , 4n+1, . . . are shifted by d12 in the x-axis direction in comparison with the self-images SP1 of the phase grating GP1 formed at the positions of m=3, 7, ..., 4n+3, .... In FIG. 6C, at a position advanced, in a direction substantially parallel to the light propagation direction, from the regions shown by the diagonal lines and the white portion of the phase grating GP2, the constructive interference portion shown by the white portion of the self-image SP2 of the phase grating GP2 is formed, and the end of the arrayed waveguide 2 is connected. Although the period of the phase grating GP1 is the same as the period of the arrayed waveguide 2 in FIGS. 6A and 6B, the period of the phase grating GP2 is twice the period of the arrayed waveguide 2 in FIG. 6C.

Accordingly, when the period of the arrayed waveguide 2 is the same, the width in the direction substantially vertical to the light propagation direction of the region with a small refractive index of the phase grating GP2 of FIG. 6C is twice the width in the direction substantially vertical to the light propagation direction of the region with a small refractive index of the phase grating GP1 of FIGS. 6A and 6B. A light propagation direction width L1 of the phase grating GP2 is a length corresponding to the phase difference $\pi$, and the light propagation direction width L1 of the phase grating GP1 is a length corresponding to the phase difference $\pi/2$; therefore, the width in the direction substantially parallel to the light propagation direction of the region with a small refractive index of the phase grating GP2 is twice the width in the direction substantially parallel to the light propagation direction of the region with a small refractive index of the phase grating GP1. When the region with a small refractive index thus increases, light radiation loss increases when light propagates in the region with a small refractive index.

In the phase grating GP2, a value obtained by dividing the width of the region with a large refractive index in the direction substantially vertical to the light propagation direction by the period of the phase grating GP2 in the direction substantially vertical to the light propagation direction is defined as duty ratio. FIG. 7 is a view showing the calculation results of the Talbot effect of the phase grating GP2 with various duty ratios. The duty ratios of the phase grating GP2 at the left end, the center, and the right end of FIG. 7 are 0.75, 0.5, and 0.25, respectively. In FIG. 7, incident light is parallel light, and the phase grating GP2 is disposed at the left end of each drawing. As the duty ratio becomes larger, the peak can be clearly formed at the positions of m=2, 4, .... Accordingly, when the arrayed waveguide 2 is disposed at the peak position, the period of the phase grating GP2 and the period of the arrayed waveguide 2 are the same as each other, and the light radiation loss can be suppressed when light propagates in the region with a small refractive index.

As described above, due to the Talbot effect, the self-image SP1, SP2, or SA of the grating GP1, GP2, or GA is formed according to the wavelength $\lambda$ of the incident light and the period of the grating GP1, GP2 or GA formed in the slab waveguide 1. The end of the arrayed waveguide 2 is disposed at the position where the constructive interference portion of the self-image SP1, SP2, or SA of the grating GP1, GP2 or GA is formed, whereby the light is concentrated on the arrayed waveguide 2 and propagates as a propagation mode when light enters from the slab waveguide 1 toward the arrayed waveguide 2. Accordingly, when the light enters from the slab waveguide 1 to the arrayed waveguide 2, the insertion loss can be reduced. Due to reciprocity of light, this also applies to the case where the light enters from the arrayed waveguide 2 toward the slab waveguide 1. When the arrayed waveguide 2 is branched near the boundary with the slab waveguide 1, each end of the branched arrayed waveguides 2 is disposed at the position where the constructive interference portion is formed.

Embodiment 2

In an Embodiment 2, a method of designing an optical waveguide will be described. First, a method of setting a light propagation direction width L1 of phase gratings GP1 and GP2 will be described, next, a method of setting a light propagation direction width L2 of an interference region IF will be described, and finally, a method of setting a position of an end of an arrayed waveguide 2 will be described.

In order to clearly form a self-image SP1 of the phase grating GP1 at the end of the arrayed waveguide 2, the light propagation direction width L1 of the phase grating GP1 is set so that a phase difference given to light by the phase grating GP1 is preferably 80 to 100°, more preferably 90°. In order to clearly form a self-image SP2 of the phase grating GP2 at the end of the arrayed waveguide 2, the light propagation direction width L1 of the phase grating GP2 is set so that a phase difference given to light by the phase grating GP2 is preferably 170 to 190°, more preferably 180°.

Wavelength of light in vacuum is represented by $\lambda$, a refractive index of a region with a large refractive index is represented by n, the refractive index of a region with a small refractive index is represented by $n-\delta n$, and a relative refractive index difference between the region with a large refractive index and the region with a small refractive index is represented by $\Delta=\delta n/n$. A phase lead angle at the time when light passes from a start end to a terminal end of the region with a large refractive index is $L1\div(\lambda/n)\times 2\pi=2\pi nL1/\lambda$. The phase lead angle at the time when light passes from a start end to a terminal end of the region with a small refractive index is $L1\div(\lambda/(n-\delta n))\times 2\pi=2\pi(n-\delta n)L1/\lambda$. The phase difference given to light by the phase grating GP is $2\pi nL1/\lambda - 2\pi(n-\delta n)L1/\lambda = 2\pi\delta nL1/\lambda = 2\pi n\Delta L1/\lambda$. L1 is preferably set to be $\lambda/(4n\Delta)$ so that the phase difference given to light by the phase grating GP1 is 90°. For example, when $\lambda=1.55$ μm, n=1.45, and $\Delta=0.75\%$, L1 is preferably set to be about 35 μm so that the phase difference given to light by the phase grating GP1 is 90°. L1 is preferably set to be $\lambda/(2n\Delta)$ so that the phase difference given to light by the phase grating GP2 is 180°. For example, when $\lambda=1.55$ μm, n=1.45, and $\Delta=0.75\%$, L1 is preferably set to be about 70 μm so that the phase difference given to light by the phase grating GP2 is 180°.

In order to clearly form the self-image SP of the phase grating GP at the end of the arrayed waveguide 2, the light propagation direction width L2 of the interference region IF is set based on the descriptions of FIGS. 1 to 4.

When the wavelength of light in vacuum is represented by $\lambda$, and the refractive index of the interference region IF is represented by n being equal to the above refractive index of the region with a large refractive index, the wavelength in the interference region IF of light is $\lambda/n$. Based on the description of FIG. 1, L2 is set to be $md^2/(2(\lambda/n))$ as an optimum design with respect to the phase grating GP1. For example, when d=10.0 μm, $\lambda=1.55$ μm, and n=1.45, L2 is set to be about 47 μm as an optimum design when m=1. Based on the description of FIG. 2, L2 is set to be $md^2/(8(\lambda/n))$ as an optimum design with respect to the phase grating GP2. For example, when d=20.0 μm, $\lambda=1.55$ μm, n=1.45, L2 is set to be about 47 μm as an optimum design when m=1. Based on the description of FIG. 3, the calculation result of the Talbot effect is obtained with due consideration of diffusion of light, and L2 is set as the optimum design.

Figure 8:
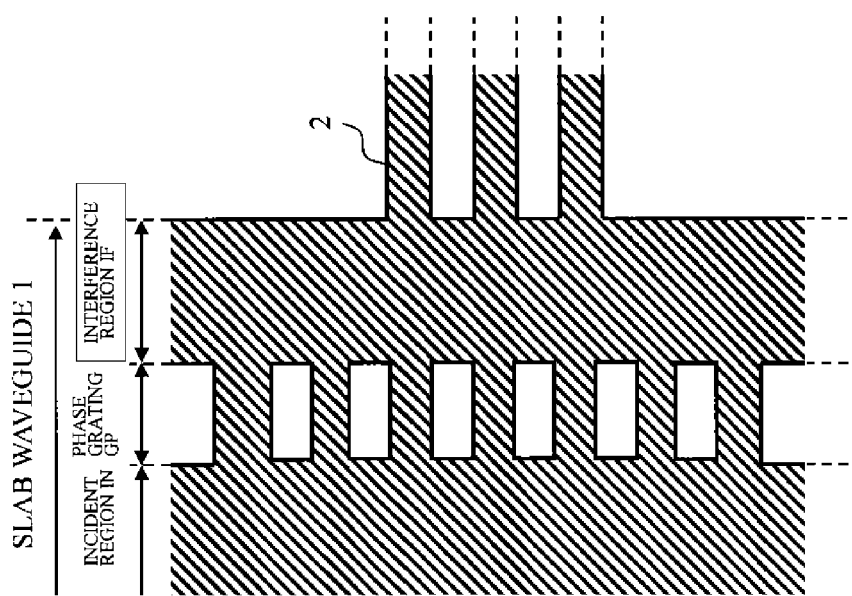
FIG. 8 is a view showing a positional relationship between the phase grating of the slab waveguide and the incident end of the arrayed waveguide.

After the light propagation direction width L2 of the interference region IF is set based on the descriptions of FIGS. 1 to 4, a constructive interference portion of the self-image SP of the phase grating GP at the terminal end of the interference region IF is set as the position of the end of the arrayed waveguide 2 based on the descriptions of FIGS. 1 to 4. It is preferable that among the ends of the plurality of arrayed waveguides 2, the self-image SP of the phase grating GP is clearly formed at not only the end of the center arrayed waveguide 2 but also the ends of the arrayed waveguides 2 disposed at both edges of the plurality of arrayed waveguides 2. Thus, the positional relationship between the phase grating GP of the slab waveguide 1 and the end of the arrayed waveguide 2 is preferably the positional relationship shown in FIG. 8. Namely, it is preferable that the number of the regions with a large refractive index of the phase grating GP is larger than the number of the arrayed waveguides 2.

In order to reduce the size of the optical waveguide as well as to clearly form the self-image SP or SA of the grating GP or GA, it is preferable that m is set to be small so that the light propagation direction width L2 of the interference region IF becomes short. The grating GP or GA may have any shape including a shape to be described in an Embodiment 3 as long as it has a function of diffracting light. As in the above description, the present disclosure does not increase the size of the optical waveguide and does not make the design difficult. When the present disclosure is not employed, the propagation loss between the slab waveguide 1 and the arrayed waveguide 2 is approximately 0.45 dB; however, when this disclosure is employed in the above designing method, the loss can be reduced to not more than 0.1 dB.

Embodiment 3

In the Embodiment 3, a method of manufacturing an optical waveguide will be described. FIGS. 9 to 12D are views showing a structure of the optical waveguide. The optical waveguide shown in FIGS. 9 to 11 and the optical waveguide shown in FIGS. 12A, 12B, 12C and 12D are different in the structure of a phase grating GP.

Figure 9:
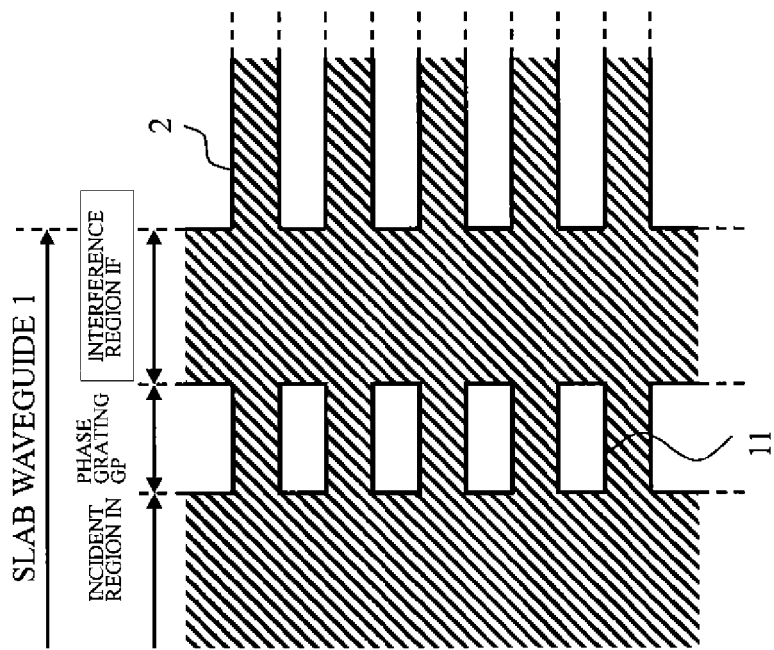
FIG. 9 is a view showing a structure of an optical waveguide.

The phase grating GP shown in FIG. 9 is provided with refractive index difference regions 11. The refractive index difference regions 11 are disposed in a slab waveguide 1 at a distance in a direction substantially vertical to a light propagation direction and have a refractive index different from the refractive index of a region shown by diagonal lines. Although the refractive index difference region 11 has a rectangular shape in the optical waveguide shown in FIG. 9, the refractive index difference region 11 may have any shape.

The refractive index of the refractive index difference region 11 may be larger or smaller than the refractive index of the region shown by diagonal lines. A region with a large refractive index and a region with a small refractive index are alternately arranged in the direction substantially vertical to the light propagation direction, whereby the phase grating GP can be easily formed.

The methods of manufacturing an optical waveguide shown in FIG. 9 include a method using lithography and etching and a method using ultraviolet irradiation.

In the method using lithography and etching, first, $SiO_2$ fine particles becoming a lower clad layer and $SiO_2$—$GeO_2$ fine particles becoming a core layer are deposited on a Si substrate by a flame hydrolysis deposition method, and are heated and melted to be transparent. Next, an unnecessary portion of the core layer is removed by lithography and etching to form an optical circuit pattern, and at the same time, an unnecessary portion of the core layer is removed from a portion becoming the refractive index difference region 11. Finally, the $SiO_2$ fine particles becoming an upper clad layer are deposited by the flame hydrolysis deposition method, and are heated and melted to be transparent, whereby the upper clad layer is formed, so that the portion becoming the refractive index difference region 11 is filled with a clad material. Since the portion becoming the refractive index difference region 11 is filled with the clad material, the refractive index of the refractive index difference region 11 is smaller than the refractive index of the region shown by diagonal lines. In the above case, the refractive index difference region 11 is formed in the formation process of the slab waveguide 1 and the arrayed waveguide 2, however, after the formation of the slab waveguide 1 and the arrayed waveguide 2, the portion becoming the refractive index difference region 11 may be grooved and filled with resin and so on having a refractive index different from the refractive index of the core layer, or the refractive index difference region 11 may be formed by an air space using only grooving.

The method using ultraviolet irradiation utilizes the phenomenon that the refractive index is increased by ultraviolet irradiation. In the first method, after the formation of the lower clad layer and the core layer, or after the formation of the lower clad layer, the core layer, and the upper clad layer, a mask material is formed on the portion becoming the refractive index difference region 11, and the refractive indices of portions other than the portion becoming the refractive index difference region 11 are changed by ultraviolet irradiation, whereby the refractive index difference region 11 is formed. The refractive index of the refractive index difference region 11 is smaller than the refractive index of the region shown by diagonal lines. In the second method, after the formation of the lower clad layer and the core layer, or after the formation of the lower clad layer, the core layer, and the upper clad layer, a mask material is formed on a portion other than the portion becoming the refractive index difference region 11, and the refractive index of the portion becoming the refractive index difference region 11 is changed by ultraviolet irradiation, whereby the refractive index difference region 11 is formed. The refractive index of the refractive index difference region 11 is larger than the refractive index of the region shown by diagonal lines.

Figure 10:
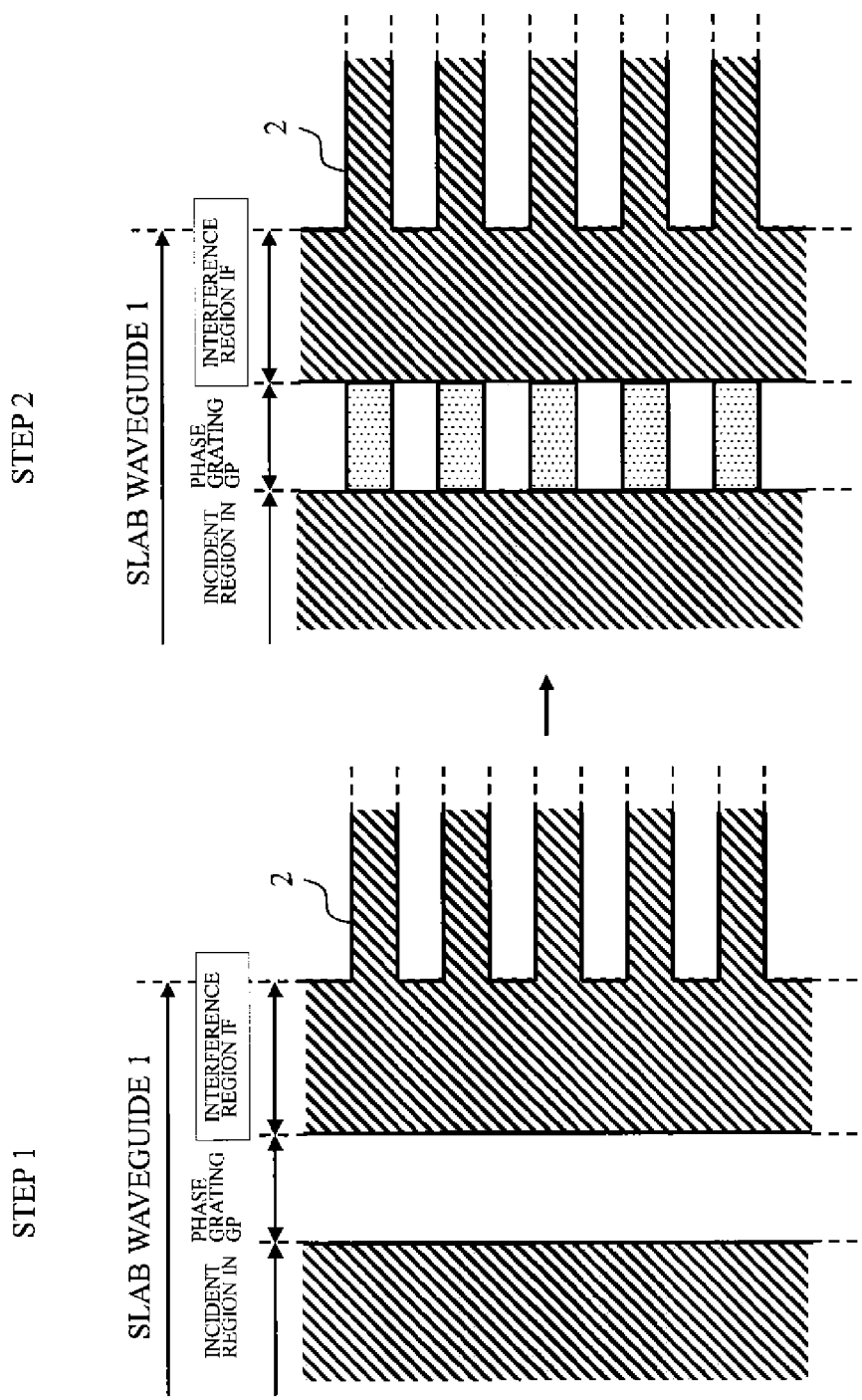
FIG. 10 is a view showing a method of manufacturing the optical waveguide using ultraviolet irradiation.
Figure 11:
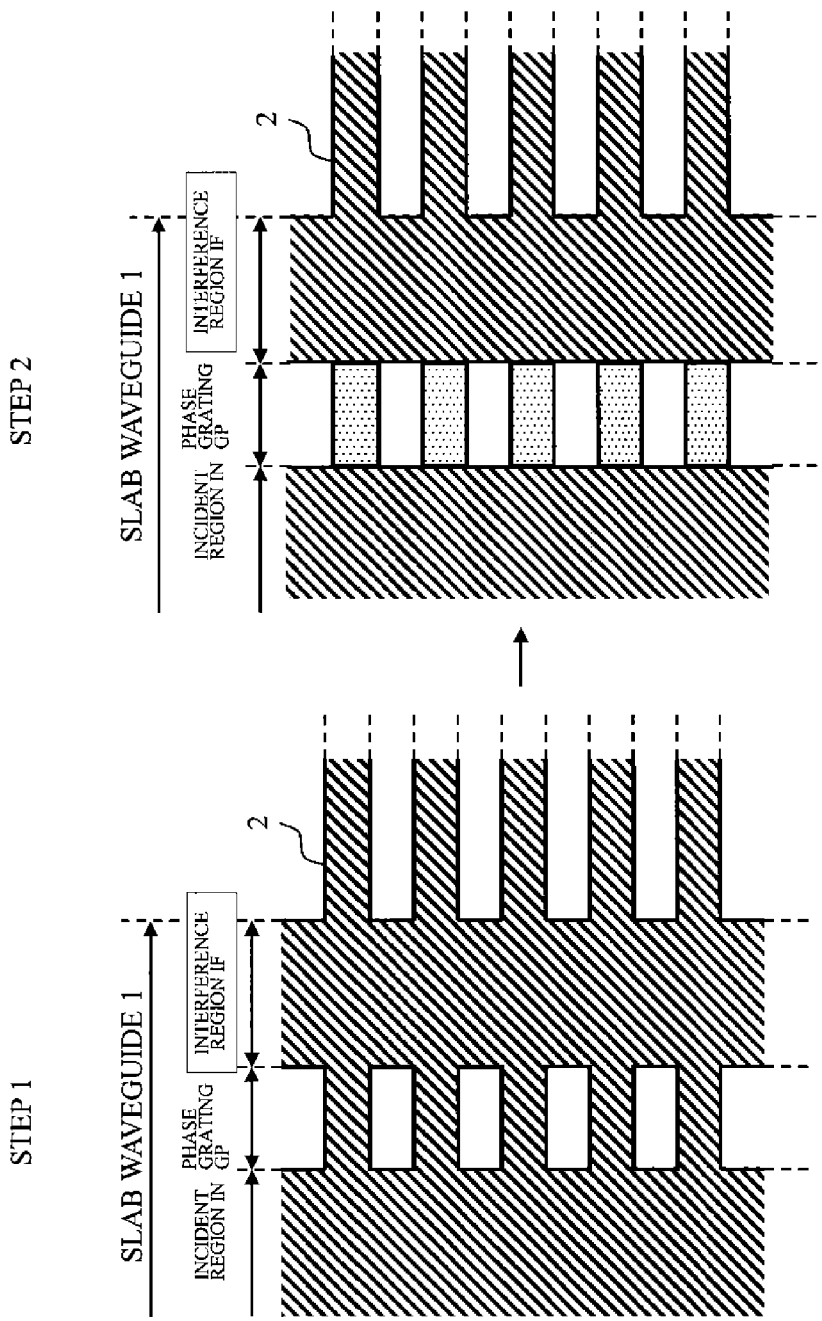
FIG. 11 is a view showing the method of manufacturing the optical waveguide using ultraviolet irradiation.

FIGS. 10 and 11 are views showing the method of manufacturing an optical waveguide shown in FIG. 9 using ultraviolet irradiation. In the manufacturing method shown in FIG. 10, as shown in STEP 1, the upper clad layer is formed after the core layer is removed from the portion becoming the phase grating GP. Then, as shown in STEP 2, ultraviolet irradiation is performed after the mask material is formed on the portion becoming the refractive index difference region 11 or the portion other than the portion becoming the refractive index difference region 11. In the manufacturing method shown in FIG. 11, as shown in STEP 1, the upper clad layer is formed after the core layer is processed as shown in FIG. 9 at a portion becoming the phase grating GP. Then, as shown in STEP 2, ultraviolet irradiation is performed after the mask material is formed on the portion becoming the refractive index difference region 11. The refractive index difference between the refractive index difference region 11 and the region shown by diagonal lines further increases after the ultraviolet irradiation compared to before the irradiation.

The interference region IF may be provided with any material as long as it has a function of interfering light. For example, the interference region IF may be provided with at least one of materials including a core material, a clad material, $SiO_2$—$GeO_2$ irradiated with ultraviolet light, resin, and air.

The methods of manufacturing an optical waveguide shown in FIGS. 12A to 12D are similar to the method of manufacturing an optical waveguide shown in FIG. 9. In a case where an upper clad material, resin, and so on are used to fill the refractive index difference region to form the refractive index difference region, it may be difficult to uniformly fill the refractive index difference region 11 with the upper clad material, the resin, and so on when a periphery of the refractive index difference region 11 is surrounded by the region shown by diagonal lines as shown in FIG. 9. On the other hand, as shown in FIGS. 12A to 12D, when refractive index difference region 12 forming the phase grating GP is integral across the entire phase grating GP, it is easy that the refractive index difference region is uniformly filled with the upper clad material, the resin, and so on.

Figure 12A:
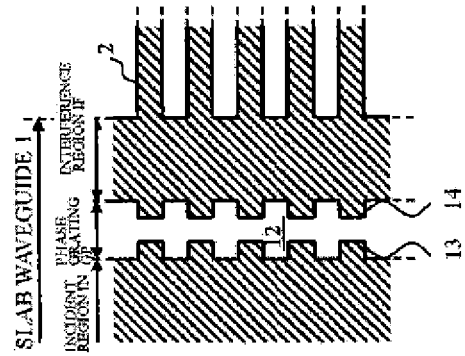
FIGS. 12A, 12B, 12C and 12D are views showing a structure of the optical waveguide.

The phase grating GP shown in FIG. 12A is provided with the refractive index difference region 12 and convex regions 13 and 14. The refractive index difference region 12 is provided with regions having a large width and regions having a small width in the direction substantially vertical to the light propagation direction, and is integral across the entire phase grating GP. The regions with a large width are arranged in the slab waveguide 1 at a distance in the direction substantially vertical to the light propagation direction, and have a refractive index different from the refractive index of the region shown by diagonal lines. Each of the regions with a small width is held between the convex regions 13 and 14, has a refractive index equal to the refractive index of the regions with a large width, and connects the regions with a large width adjacent thereto.

The refractive index of the refractive index difference region 12 may be larger or smaller than the refractive index of the portion shown by diagonal lines. The region with a large refractive index and the region with a small refractive index are alternately arranged in the direction substantially vertical to the light propagation direction, whereby the phase grating GP can be easily formed.

Figure 12B:
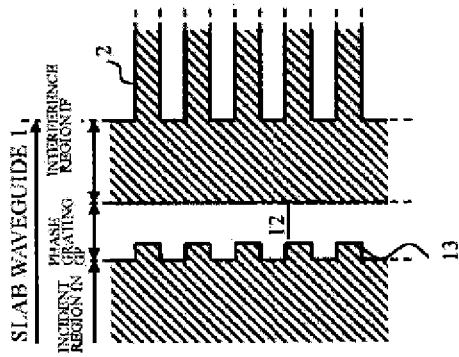
Figure 12C:
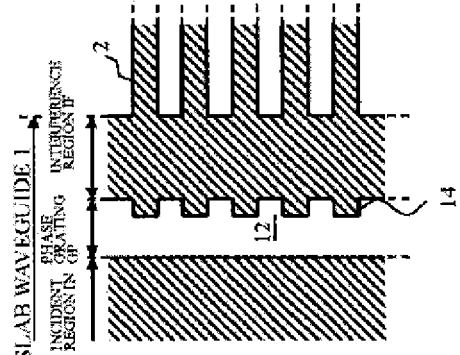

Although the convex regions 13 and 14 are arranged in the optical waveguide shown in FIG. 12A, only the convex regions 13 may be disposed as in the optical waveguide shown in FIG. 12B, and only the convex regions 14 may be disposed as in the optical waveguide shown in FIG. 12C. In the optical waveguide shown in FIG. 12A, the sum of the light propagation direction widths of the convex regions 13 and 14 is set to L1 shown in FIGS. 6A to 6C, in the optical waveguide shown in FIG. 12B, the light propagation direction width of the convex region 13 is set to L1 shown in FIGS. 6A to 6C, and in the optical waveguide shown in FIG. 12C, the light propagation direction width of the convex region 14 is set to L1 shown in FIGS. 6A to 6C. In the optical waveguides shown in FIGS. 12A to 12C, although the convex regions 13 and 14 have a rectangular shape, they may have any shape.

In the optical waveguide shown in FIGS. 12A and 12B, a concave region between the convex regions 13 adjacent thereto in the direction substantially vertical to the light propagation direction may have any shape. In the optical waveguide shown in FIGS. 12A and 12C, a concave region between the convex regions 14 adjacent thereto in the direction substantially vertical to the light propagation direction may also have any shape. Moreover, a boundary surface of the incident region IN or the interference region IF may also have any shape.

Figure 13A:
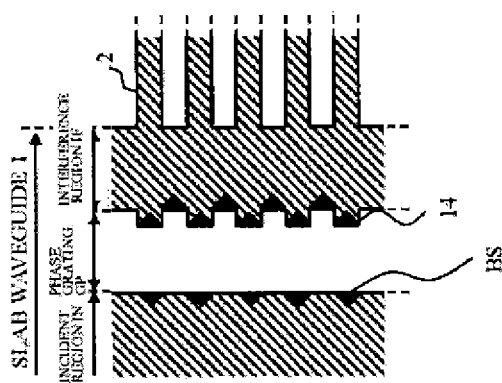
FIGS. 13A and 13B are views showing a structure of the optical waveguide.

As a variation of the optical waveguide shown in FIG. 12A, as in the optical waveguide shown in FIG. 13A, a boundary surface region BS may be formed on a boundary surface between the convex region 13 and the refractive index difference region 12, on a boundary surface between the convex region 14 and the refractive index difference region 12, and on a boundary surface between the concave region and the refractive index difference region 12. The boundary surface region BS shown in FIG. 13A has a refractive index which is the same as the refractive index of a core material constituting the interference region IF or has a refractive index between the refractive index of the core material constituting the interference region IF and the refractive index of the clad material constituting the refractive index difference region 12.

Figure 13B:
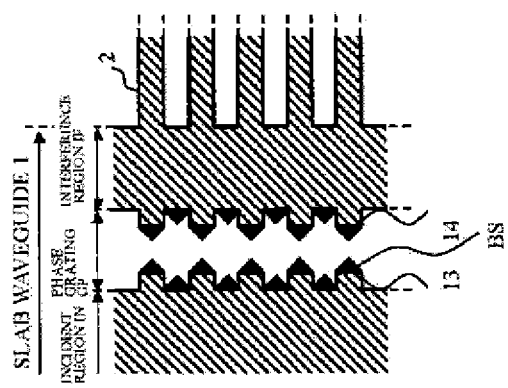

As a variation of the optical waveguide shown in FIG. 12C, as in the optical waveguide shown in FIG. 13B, the boundary surface region BS may be formed on a boundary surface between the convex region 14 and the refractive index difference region 12, on a boundary surface between the incident region IN or the interference region IF and the refractive index difference region 12, and on a boundary surface between the concave region and the refractive index difference region 12. The boundary surface region BS shown in FIG. 13B has a refractive index which is the same as the refractive index of the clad material constituting the refractive index difference region 12 or has a refractive index between the refractive index of the core material constituting the interference region IF and the refractive index of the clad material constituting the refractive index difference region 12.

As in the optical waveguide shown in FIGS. 13A and 13B, the boundary surface region BS whose surface extends in a direction different from directions substantially parallel and substantially vertical to the light propagation direction is formed on a boundary surface between regions with different refractive indices, whereby it is possible to prevent light from being reflected, and it is also possible to prevent light from being reflected toward an input/output waveguide connected to the slab end. In the optical waveguides shown in FIGS. 13A and 13B, although one kind of material is used as a material of the boundary surface region BS, a plurality of kinds of materials may be used in combination.

Figure 12D:
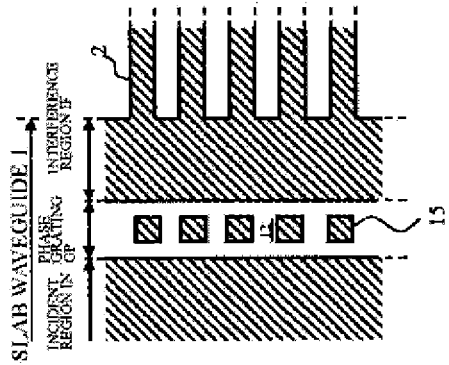

The phase grating GP shown in FIG. 12D is provided with the refractive index difference region 12 and an island-shaped region 15. The refractive index difference region 12 is provided with regions having a large width and regions having a small width in the direction substantially vertical to the light propagation direction, and is integral across the entire phase grating GP. The regions with a large width are arranged in the slab waveguide 1 at a distance in the direction substantially vertical to the light propagation direction and have a refractive index different from the refractive index of the region shown by diagonal lines. Each of the regions with a small width is held between the region shown by diagonal lines and the island-shaped region 15, has a refractive index equal to the refractive index of the regions with a large width, and connects the regions with a large width adjacent thereto.

The refractive index of the refractive index difference region 12 may be larger or smaller than the refractive index of the portion shown by diagonal lines. The region with a large refractive index and the region with a small refractive index are alternately arranged in the direction substantially vertical to the light propagation direction, whereby the phase grating GP can be easily formed.

In the optical waveguide shown in FIG. 12D, the light propagation direction width of the island-shaped region 15 is set to L1 shown in FIGS. 6A to 6C. In the optical waveguide shown in FIG. 12D, although the island-shaped region 15 has a rectangular shape, the island-shaped region 15 may have any shape. Also in the optical waveguide shown in FIG. 12D, as in the optical waveguide shown in FIGS. 13A and 13B, the boundary surface region BS may be formed on a boundary surface between regions with different refractive indices.

In the optical waveguide shown in FIGS. 12A, 12B, 12C and 12D, although the convex regions 13 and 14 or the island-shaped region 15 are formed on an extension line of the arrayed waveguide 2, the convex regions 13 and 14 or the island-shaped region 15 may be formed on an extension line between the arrayed waveguides 2 adjacent to each other in the direction substantially vertical to the light propagation direction. As in the optical waveguide shown in FIGS. 14A, 14B and 14C, as long as a phase difference can be given to light, the convex regions 13 and 14 or the island-shaped region 15 may be formed on the extension line of the arrayed waveguide 2 and the extension line between the arrayed waveguides 2 adjacent to each other in the direction substantially vertical to the light propagation direction.

In the optical waveguide shown in FIG. 14A, the convex regions 13 and 14 are formed on the extension line of the arrayed waveguide 2, and the island-shaped region 15 is formed on the extension line between the arrayed waveguides 2 adjacent to each other in the direction substantially vertical to the light propagation direction. The convex region 13 and the island-shaped region 15 adjacent to each other are connected at the corners, and the convex region 14 and the island-shaped region 15 adjacent to each other are connected at the corners.

In the optical waveguide shown in FIG. 14B, the convex regions 13 and 14 are formed on the extension line of the arrayed waveguide 2, an island-shaped region 15-1 is formed on the extension line between the arrayed waveguides 2 adjacent to each other in the direction substantially vertical to the light propagation direction, and an island-shaped region 15-2 is formed on the extension line of the arrayed waveguide 2. The island-shaped regions 15-1 and 15-2 are arranged at a distance in the direction substantially vertical to the light propagation direction, and the island-shaped regions 15-1 and 15-2 thus arranged are alternately arranged in the direction substantially parallel to the light propagation direction. The convex region 13 and the island-shaped region 15-1 adjacent to each other are connected at the corners, the convex region 14 and the island-shaped region 15-1 adjacent to each other are connected at the corners, and the island-shaped regions 15-1 and 15-2 adjacent to each other are connected at the corners.

In the optical waveguide shown in FIG. 14C, the convex regions 13 and 14 are formed on the extension line of the arrayed waveguide 2, and the island-shaped region 15 is formed on the extension line between the arrayed waveguides 2 adjacent to each other in the direction substantially vertical to the light propagation direction. The convex region 13 and the island-shaped region 15 adjacent to each other are not connected, and the convex region 14 and the island-shaped region 15 adjacent to each other are not connected.

When the amplitude grating GA is formed instead of the phase grating GP, the portion becoming the refractive index difference region 11 of FIG. 9 is filled with a light-shielding material which is excellent in light absorption. As the light-shielding material, a silicone resin, an epoxy resin, or the like mixed with carbon black and metal fine particles is used.

Embodiment 4

In the Embodiment 4, an arrayed waveguide grating provided with the optical waveguide described in the Embodiments 1 to 3 will be described. In the arrayed waveguide grating, one or more first input/output waveguide(s), a first slab waveguide, a plurality of arrayed waveguides, a second slab waveguide, and one or more second input/output waveguide(s) are connected in this order. The first slab waveguide and the plurality of arrayed waveguides constitute the optical waveguide described in the Embodiments 1 to 3, serving as a slab waveguide 1 and an arrayed waveguide 2, respectively.

Although light with a plurality of wavelengths propagates in the first slab waveguide, an arbitrary wavelength in the plurality of wavelengths is selected as λ in FIGS. 1 and 2. The arbitrary wavelength is a center wavelength in the plurality of wavelengths, for example. When the arbitrary wavelength is selected, the designing method described in the Embodiment 2 and the manufacturing method described in the Embodiment 3 are applied.

The grating may be disposed in not only the first slab waveguide but also the second slab waveguide. The grating may be disposed in only the first slab waveguide, and the transition region of the Patent Documents 1 to 4 or the slope portion of the Patent Document 5 may be disposed in the second slab waveguide.

Embodiment 5

Figure 15:
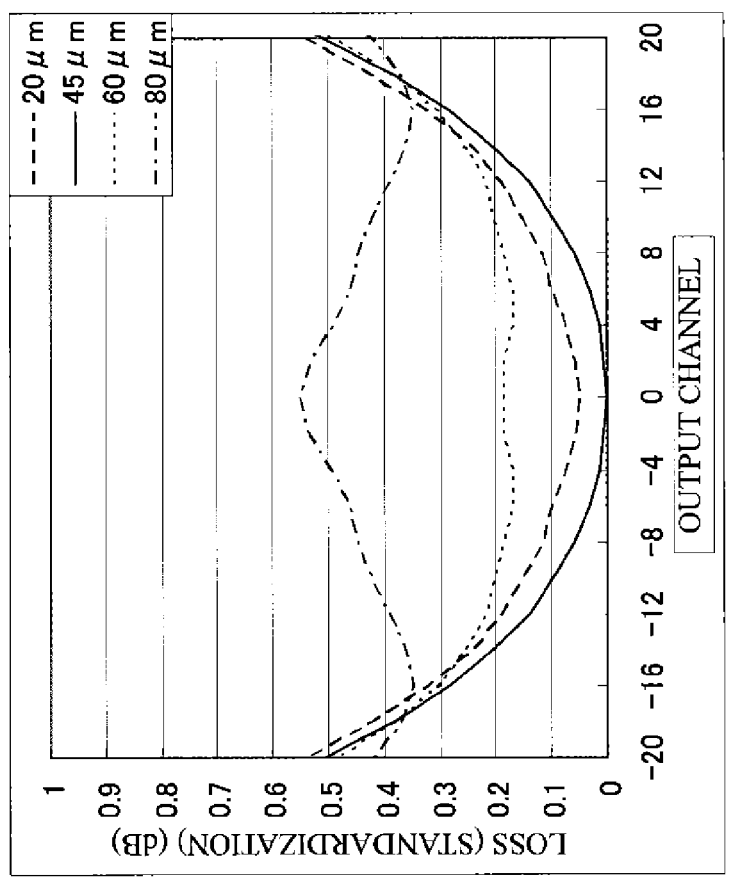
FIG. 15 is a view showing loss distributions between output channels.
Figure 16:
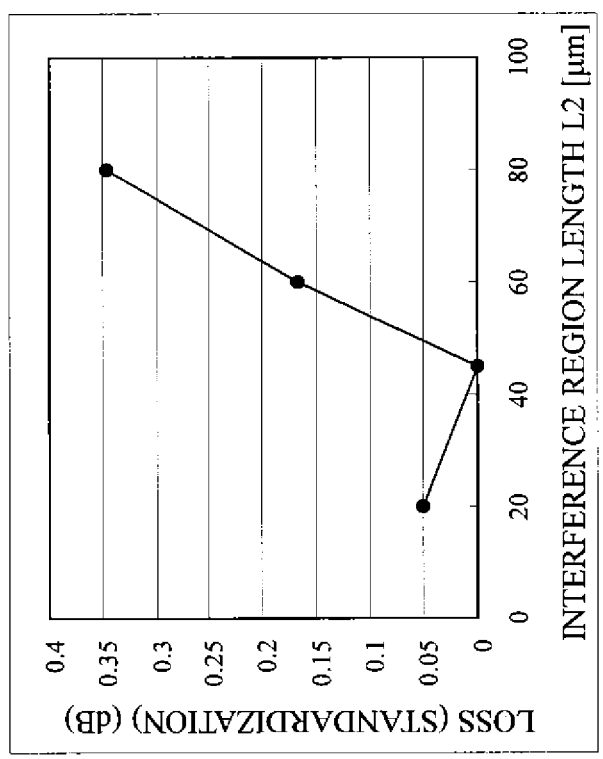
FIG. 16 is a view showing a relationship between an interference region length and a minimum loss.
Figure 17:
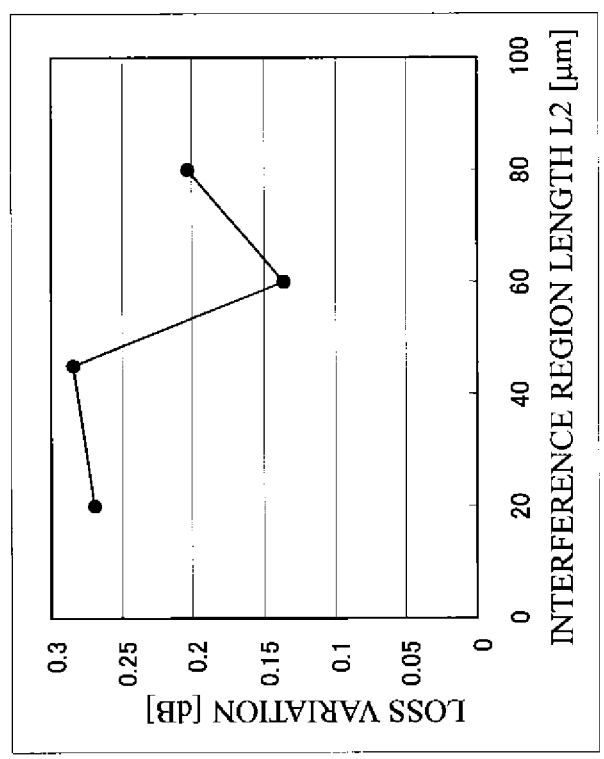
FIG. 17 is a view showing a relationship between the interference region length and loss variation between the output channels.

In an arrayed waveguide grating, when light input from a center port is demultiplexed, loss imbalance occurs between output ports. This is because phase error dependent on wavelength is given to light reaching the output port; and the farther away from an output side center port, the larger the phase error. When lights are multiplexed according to the reciprocity of light, intensity imbalance due to wavelength occurs. When a phase grating is provided, the phase grating is designed by one wavelength; therefore, the phase error due to deviation from design wavelength occurs, also resulting in imbalance. In the Embodiment 5, there will be described the fact that, in the case where the arrayed waveguide grating described in the Embodiment 4 is used as a demultiplexer, a light propagation direction width L2 of an interference region IF provided in an output side slab waveguide is adjusted, whereby the loss uniformity between output channels can be improved. FIGS. 15 to 17 are views showing calculation results of insertion loss of the arrayed waveguide grating with various light propagation direction widths L2 of the interference region IF, wherein a phase grating GP1 is used, and d=10.0 μm, λ=1.55 μm, and n=1.45.

FIG. 15 is a view showing loss distributions between the output channels depending on various L2. The output center port is represented as "0", and in L=45 μm corresponding to m~1 with the least loss, normalization is performed with reference to loss of a center channel. In L=45 μm corresponding to m~1, although loss of the output channel near the center is reduced, the closer to both edges of the output channel, the larger the loss. This is because the farther away from the center port, the larger the phase error. When L2 is changed to shift from the state of the orders of m~1, and, thus, to place in a defocusing state, although the loss of the output channel near the center significantly increases, the loss is less affected, and the loss distribution becomes flat, since the phase error originally occurs at the edges.

FIG. 16 is a view showing a relationship between L2 and minimum loss in 33 output channels, i.e. −16 to 16 channels, described in FIG. 15, and FIG. 17 is a view showing a relationship between L2 and loss variation between output channels. When the 33 output channels, i.e. −16 to 16 channels, are used, it can be shown that the loss variation is reduced the most when L2=60 µm.

As described above, the loss and the loss variation are changed by changing L2, therefore, by optimizing L2, the optical waveguide can be designed depending on the number of the output channels and a purpose of use of the optical waveguide. Although there has been described the phase grating provided in the output side slab waveguide when used as a demultiplexer in the present embodiments, the same applies to the phase grating provided in an input side slab waveguide when used as a multiplexer. If the phase gratings are provided in the both slab waveguides, when used as a multiplexer or a demultiplexer, the loss variation can be reduced even if light is input from either of the slab waveguides.

EXPLANATION OF REFERENCE SIGNS

1: Slab waveguide
2: Arrayed waveguide
11, 12: Refractive index difference region
13, 14: Convex region
15: Island-shaped region
GP: Phase grating
GA: Amplitude grating
SP, SA: Self-image
ED: End region
IF: Interference region
BS: Boundary surface region

The invention claimed is:

1. An arrayed waveguide grating comprising:
   two or more first input/output waveguides;
   a first slab waveguide connected to an end of the first input/output waveguides;
   an arrayed waveguide connected to an end of the first slab waveguide on an opposite side of the first input/output waveguides;
   a second slab waveguide connected to a first end of the arrayed waveguide on an opposite side of the first slab waveguide;
   one or more second input/output waveguide(s) connected to an end of the second slab waveguide on an opposite side of the arrayed waveguide; and
   a grating formed in the first slab waveguide at a distance from the end of the first slab waveguide, and wherein a second end of the arrayed waveguide is connected to a position deviated from a position where a constructive interference portion of a self-image of the grating is formed so that a light intensity distribution from the first input/output waveguides is substantially uniform when light enters from the one or more second input/output waveguide(s) toward the first input/output waveguides.

2. The arrayed waveguide grating according to claim 1, wherein the grating is a phase grating.

3. The arrayed waveguide grating according to claim 2, wherein a phase difference given to incident light by the phase grating is approximately 90 degrees.

4. The arrayed waveguide grating according to claim 2, wherein a phase difference given to incident light by the phase grating is approximately 180 degrees.

5. The arrayed waveguide grating according to claim 2, wherein the phase grating comprises refractive index difference regions which are disposed in the first slab waveguide at a distance in a direction substantially vertical to a light propagation direction and have a refractive index different from refractive indices of other regions in the first slab waveguide.

6. The arrayed waveguide grating according to claim 5, wherein the refractive index difference regions adjacent to each other are connected by a region having a refractive index equal to the refractive index of the refractive index difference regions, and the refractive index difference regions are integral with each other across the entire phase grating.

* * * * *